United States Patent [19]

Swanander et al.

[11] Patent Number: 5,738,706
[45] Date of Patent: Apr. 14, 1998

[54] SMOKE FILTRATION UNIT AND METHOD OF USING SAME

[75] Inventors: Gary A. Swanander, East Hampton, N.Y.; Bruce N. Bickford, Chester; Michael Balmer, Cromwell, both of Conn.

[73] Assignee: Air Resources, Inc., East Hampton, N.Y.

[21] Appl. No.: 626,770

[22] Filed: Mar. 29, 1996

[51] Int. Cl.$^6$ .................................. B01D 46/02
[52] U.S. Cl. ...................... 95/14; 55/212; 55/217; 55/274; 55/283; 55/304; 55/312; 55/314; 55/417; 55/467; 55/DIG. 34; 95/15; 95/20; 95/22; 95/273; 95/282; 110/216; 110/345
[58] Field of Search ........................ 95/14, 15, 19, 95/22, 23, 20, 273, 278, 282; 55/212, 214, 217, 210, 283, 274, DIG. 34, 309, 312, 314, 417, 300, 304, 305, 467; 110/345, 216

[56] References Cited

U.S. PATENT DOCUMENTS

| | | | |
|---|---|---|---|
| 1,031,570 | 7/1912 | Moxley | 55/312 |
| 1,414,722 | 5/1922 | Boynton | 55/314 |
| 1,550,357 | 8/1925 | Hess | 55/314 |
| 1,563,125 | 11/1925 | Ward | 55/314 |
| 1,997,204 | 4/1935 | Slocum | 55/309 |
| 2,282,595 | 5/1942 | Will | 55/304 |
| 2,654,582 | 10/1953 | Fox | 55/210 |
| 3,608,278 | 9/1971 | Greenspan | 55/283 |
| 3,716,967 | 2/1973 | Doyle, Jr. et al. | 55/217 |
| 4,081,255 | 3/1978 | Evans | 55/309 |
| 4,286,975 | 9/1981 | Whitely | 55/309 |
| 4,312,645 | 1/1982 | Mavros et al. | 55/213 |
| 4,334,900 | 6/1982 | Neumann | 55/417 |
| 4,353,721 | 10/1982 | Mollstatter | 55/283 |
| 4,661,129 | 4/1987 | Nederman | 55/283 |
| 4,675,029 | 6/1987 | Norman et al. | 95/73 |
| 4,898,105 | 2/1990 | Rappoldt et al. | 110/245 |
| 4,973,202 | 11/1990 | Becker | 406/151 |
| 5,099,770 | 3/1992 | Yang | 55/228 |
| 5,145,498 | 9/1992 | Houston | 55/309 |
| 5,359,946 | 11/1994 | Asoh et al. | 110/345 |
| 5,395,408 | 3/1995 | Zeritis | 55/217 |

*Primary Examiner*—Duane S. Smith
*Attorney, Agent, or Firm*—Pennie & Edmonds LLP

[57] ABSTRACT

The smoke filtration unit described herein has an internal cylindrical duct for ducting exhaust smoke from an exhaust flue to a shutter pivotally mounted within the cylindrical duct. The shutter can move between at least two positions. The shutter, when located in a first position, directs exhaust smoke to a cylindrical filter. An exhaust fan draws the exhaust smoke through the filter. The residual gas is vented to the atmosphere. The cylindrical filter is mounted on a vibration mount that can vibrate the filter to dislodge particulate matter that collects on the surface of the filter. The dislodged particulate matter falls into an ash collection area. The smoke filtration unit is controlled by a microcontroller that monitors temperature and pressure conditions within the unit. If excessive pressure conditions are detected, the microcontroller energizes the vibration mount to dislodge particulate matter from the filter. If the condition is not corrected the microcontroller moves the shutter to a second position where the exhaust smoke is vented directly to the atmosphere without first being filtered.

19 Claims, 15 Drawing Sheets

RAISED POSITION

LOWERED POSITION

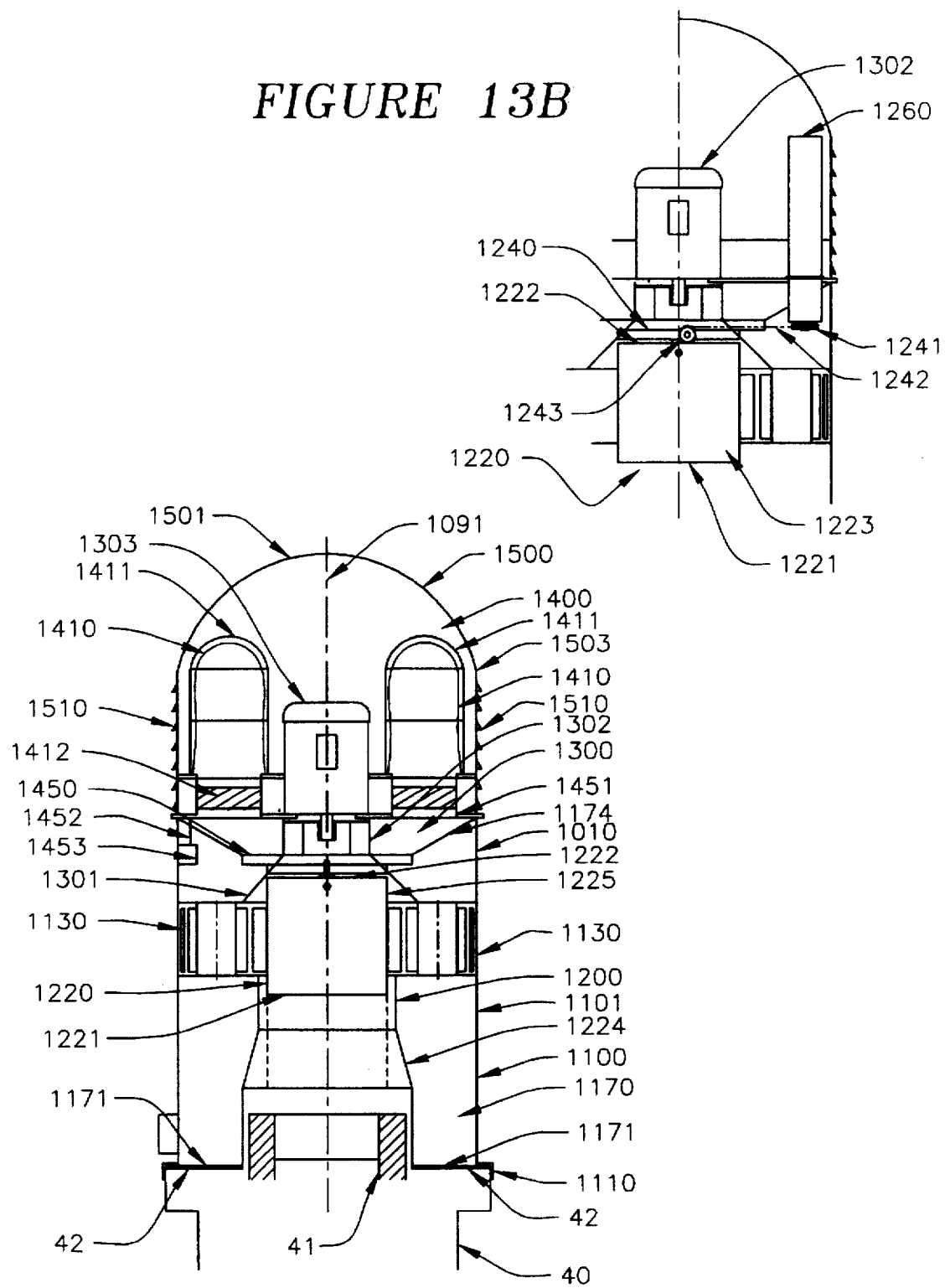

SMOKE FILTRATION UNIT AND METHOD OF USING SAME

FIELD OF THE INVENTION

The invention relates generally to air pollution control devices and more particularly to an apparatus and method for removing particulate matter from exhaust smoke produced by, e.g., fireplaces, stoves and furnaces. An electronic control is provided for automating the operation of the air pollution control device of the invention.

BACKGROUND OF THE INVENTION

Over the past century, public awareness of the need for reducing air pollution and maintaining clean air has heightened. As a result, industry and government have become increasingly involved in the problem of air pollution, and have sought ways to control it. Well-known progress has been made in controlling air pollution caused by heavy industry, power generating stations, and vehicles.

At the same time, the public has continued to enjoy the benefits of fireplaces, coal- and wood-burning stoves, and gas- and oil-fired furnaces. These devices can also substantially degrade air quality but heretofore little has been done to prevent this problem. One need only visit a residential neighborhood with a number of fireplaces and/or stoves operating to recognize that such devices can have a significant negative effect on air quality. Oil- and gas-fired furnaces also can substantially degrade air quality. Thus methods and devices for controlling air pollution caused by fireplaces, furnaces and stoves have increasingly been sought. U.S. Pat. No. 4,675,029 to Norman discloses one such apparatus that uses tubular electrodes to impart a charge on particulate matter generated by a wood-burning stove. The charged material is then attracted to and collected by an oppositely charged electrode.

In order to make air pollution control devices for fireplaces, stoves and furnaces widely available, they must be relatively inexpensive, easy to install, safe to operate, and simple to maintain. These requirements have not been readily met for various reasons in the past, due mainly to the unavailability of the technology to accomplish these goals in an affordable manner.

Now with advances in materials and electronic control technology, it has finally become possible to fabricate a simple and inexpensive device capable of significantly diminishing the air pollutants found in the smoke associated with the use of such stoves, fireplaces and furnaces.

SUMMARY OF THE INVENTION

It is an object of the invention to provide a smoke filtration unit adapted for removing particulate matter generated, e.g., by residential fireplaces, coal- and wood-burning stoves, and oil- and gas-fired furnaces. The invention is not limited, however, to use in residences and will operate equally efficiently in commercial applications.

It is another object of the invention to provide a smoke filtration unit that is easy and inexpensive to manufacture and to install, and simple to operate.

It is a further object of the invention to provide a smoke filtration unit that draws smoke through a filter in order to remove particulate matter from the smoke.

It is another object of the invention to provide a smoke filtration unit that can optionally vent unfiltered smoke directly to the atmosphere as a safety precaution.

It is still another object of the invention to provide an electronic control for use in automating the operation of the smoke filtration unit and for implementing certain safety features associated therewith.

The invention thus comprises a smoke filtration unit for removing particulate matter from exhaust smoke generated by fireplaces, coal- and wood-burning stoves, and oil- and gas-fired furnaces. The unit is particularly adapted for use in residential applications but as noted above it is not considered as being limited to such residential use.

The smoke filtration unit of the invention may be mounted, for example, on a chimney or stove pipe. The unit operates by drawing exhaust smoke from a chimney flue or stove pipe (i.e., a "smoke conduit") through a filter assembly which removes particulate matter (or "particulates") from the exhaust smoke. The filtration unit then vents the remaining "residual gas", i.e., comprising the gas remaining after removal of the particulates, to the atmosphere. For safety reasons, the smoke filtration unit of the invention can optionally exhaust unfiltered gas directly to the atmosphere.

The smoke filtration unit of the invention comprises four major assemblies, a shutter assembly, a fan drive and fan motor assembly, a filter/vibrator assembly and an electronic controller for operating the other assemblies.

The shutter assembly ducts exhaust smoke to the filter assembly where the smoke is filtered to remove particulates. The shutter assembly comprises a pivotally-mounted shutter located at the top of a smoke conduit. The shutter is moved between an open and closed position by an actuator. A counterweight is provided as a safety precaution to return the shutter to the open position in power-off situations.

The fan and fan motor assembly provide the motive force for drawing the exhaust smoke into the filter assembly and through the filter.

In one embodiment of the invention, the filter assembly comprises a cylindrical filter mounted on vibrating means, e.g., vibration mounts, adapted to vibrate the filter for removing particulate matter therefrom. The filter can be constructed from polyester, fiberglass, TEFLON (a polytetrafluoroethylene), NOMEX® (a trademark of E. I. dupont de Nemours and Company for a high-temperature, flame-resistant aramid fiber), or a variety of alternate materials known in the art that are capable of filtering particulate matter from heated exhaust smoke. The residual gas thereafter passes from the filter to an interior duct within the unit where it is drawn into the fan assembly and exhausted to the atmosphere.

An electronic controller operatively associated with the unit automates its functioning. The controller is operated by a control panel which allows the user to direct the operation of the unit. This panel may be located in any convenient location, for example, adjacent to a fireplace, stove or furnace producing the exhaust smoke.

The electronic controller initiates start-up of the unit by dislodging particulate matter from the filter by actuating the filter vibrating means. The controller then energizes the shutter mechanism to move the shutter from an open position to a closed position, thus directing the exhaust smoke toward the filter assembly. During operation, the electronic controller continually monitors the temperature of the exhaust smoke and the pressure in the filter area and the smoke conduit in order to detect fires. If the monitor detects a fire in, e.g., the chimney, the controller immediately deenergizes the smoke filtration unit, returning the shutter to its open position and thereby venting unfiltered smoke directly to the atmosphere.

Additionally, if the pressure monitor detects an overpressure condition in the filter area, this indicates that the filter is clogged with particulate matter. When such a condition is detected, the controller energizes the filter vibrating means in order to dislodge particulate matter from the filter. If the condition is not corrected, i.e., if the pressure remains above a predetermined value, the smoke filtration unit is deenergized by the controller for safety reasons, thereby returning the shutter to its open position and venting unfiltered exhaust smoke directly to the atmosphere.

In an alternate embodiment the smoke filtration unit of the invention comprises four major assemblies, a shutter assembly, a fan and fan motor assembly, a filter bag/shaker assembly and an electronic controller which operates the unit substantially as described above.

In the subject embodiment the unit operates by using a fan to draw exhaust smoke from a smoke conduit through a plurality of filter bags in order to remove particulate matter from the smoke. The residual gas passes through the sides of the bags which are permeable to the smoke but not the particulates. Vents are machined along the sides of the outer shell of the smoke filtration unit located immediately adjacent to the surface of the filter bags so that the residual gas may be vented directly to the atmosphere.

The filter bag assembly comprises, in a preferred embodiment, five such bags mounted and supported within one or more surrounding cages, however, the number of bags used is not critical. The bags can be made from polyester, fiberglass, TEFLON or NOMEX®, or a variety of alternate materials known in the art which are capable of filtering particulate matter from heated exhaust smoke.

BRIEF DESCRIPTION OF THE DRAWINGS

The above and other objects and advantages of this invention will be apparent upon consideration of the following detailed description, taken in conjunction with the accompanying drawings in which like characters refer to like parts throughout and in which:

FIGS. 13A-B are vertical cross-sectional views taken along lines 13A—13A and 13B—13B, respectively, of FIG. 12.

DETAILED DESCRIPTION OF THE PREFERRED EMBODIMENTS

The present invention is particularly suited for use in treating exhaust smoke generated by fireplaces, coal- and wood-burning stoves, and oil- and gas-fired furnaces, particularly in residential settings, but it is not limited to use in residences and may be used as well in commercial applications with no loss of performance.

I. First Preferred Embodiment

A first preferred embodiment of a smoke filtration unit made in accordance with the invention is generally depicted at FIGS. 1-11.

A. General Description

Figure 1:
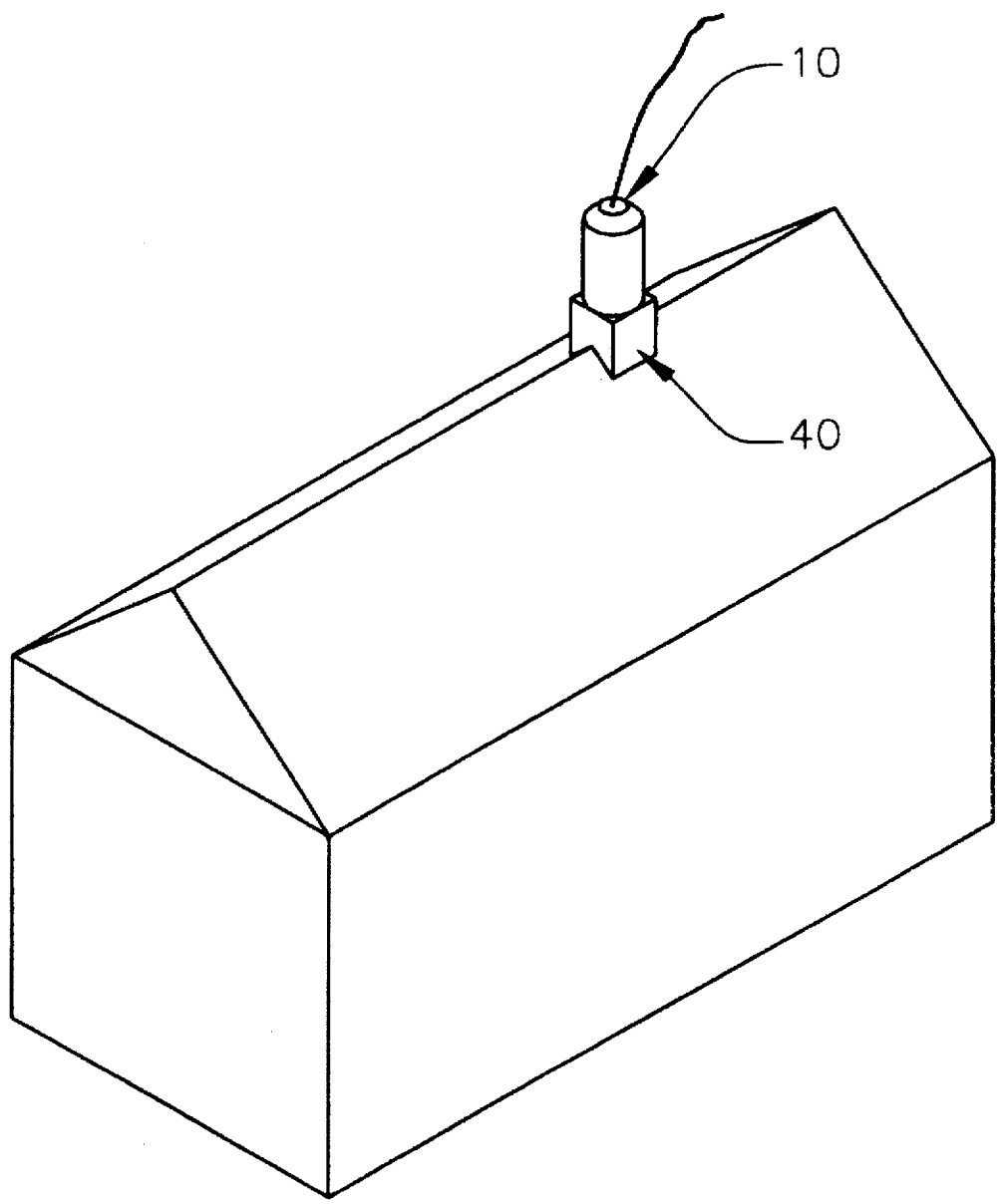
FIG. 1 is a perspective view of a smoke filtration unit made in accordance with the invention, as it appears when mounted atop a chimney.

FIG. 1 illustrates a smoke filtration unit 10 mounted atop a chimney 40 by screws, bolts or other fastening means well known in the art.

Figure 2:
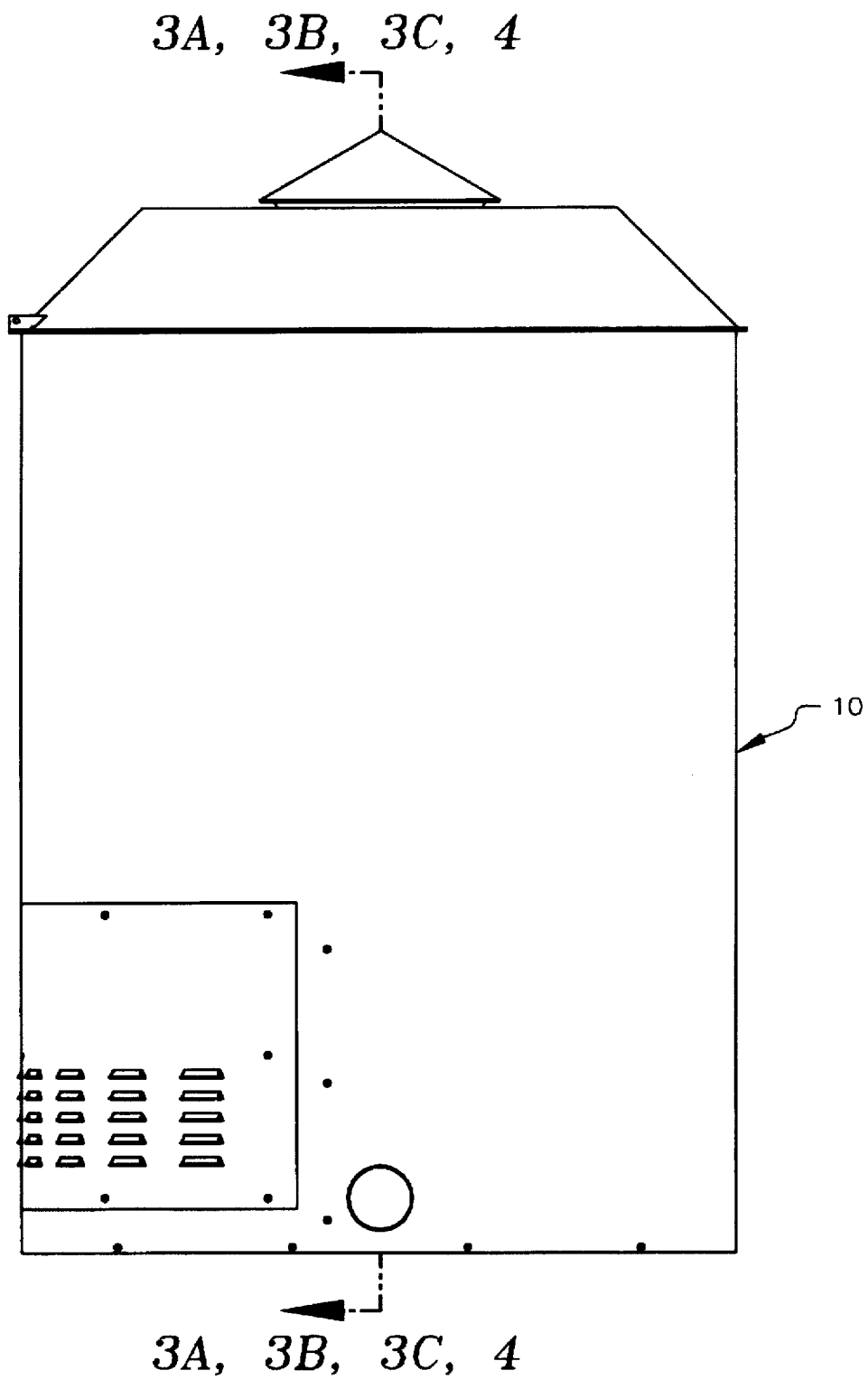
FIG. 2 is a plan view of the exterior of a smoke filtration unit made in accordance with the invention.

FIG. 2 is an exterior view of the smoke filtration unit 10.

Figure 3A:
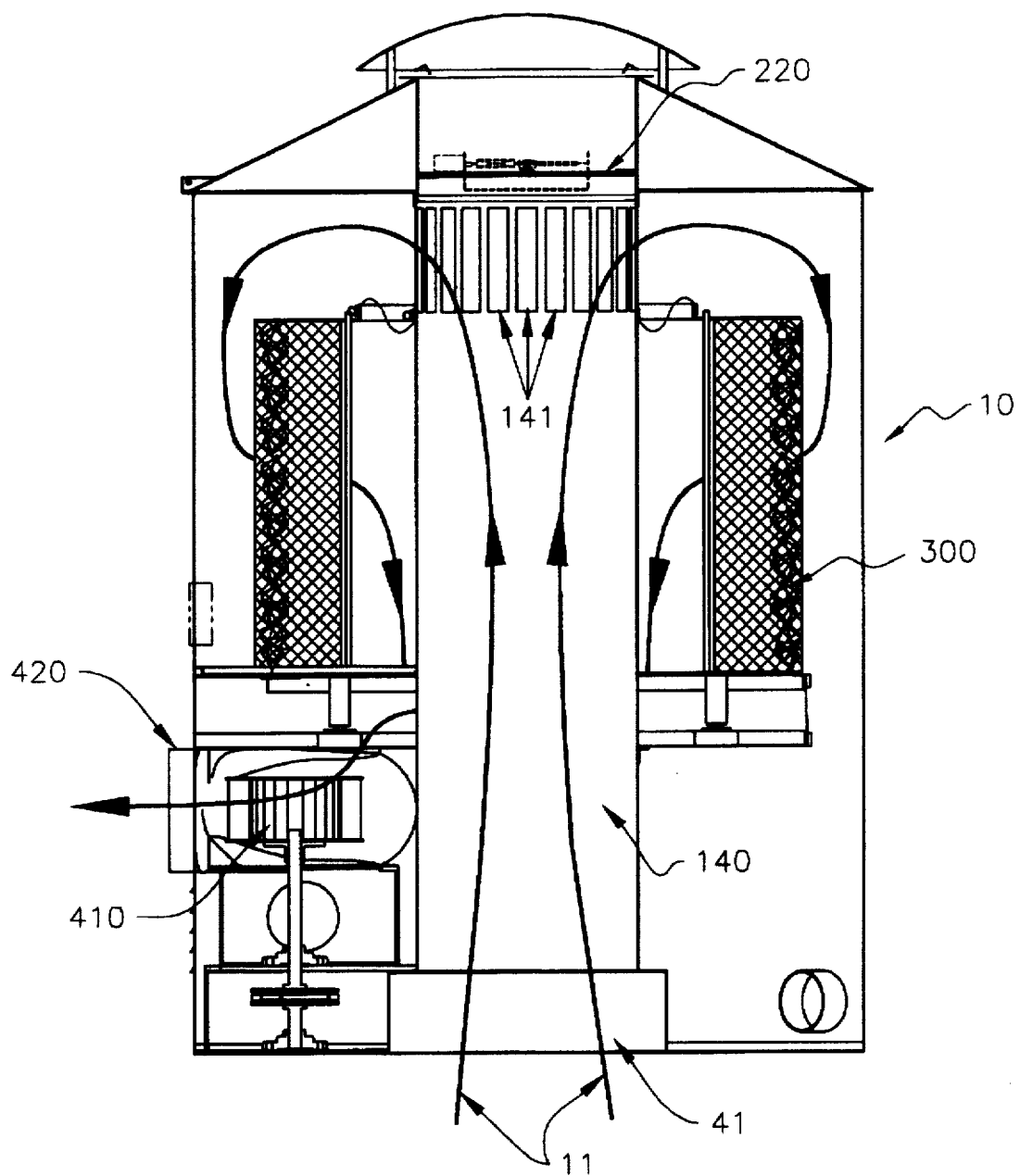
FIGS. 3A-C are cross-sectional views, each taken along line 3A, 3B, 3C, 4-3A, 3B, 3C, 4 of FIG. 2, illustrating three operating modes of the smoke filtration unit of the invention.
Figure 3B:
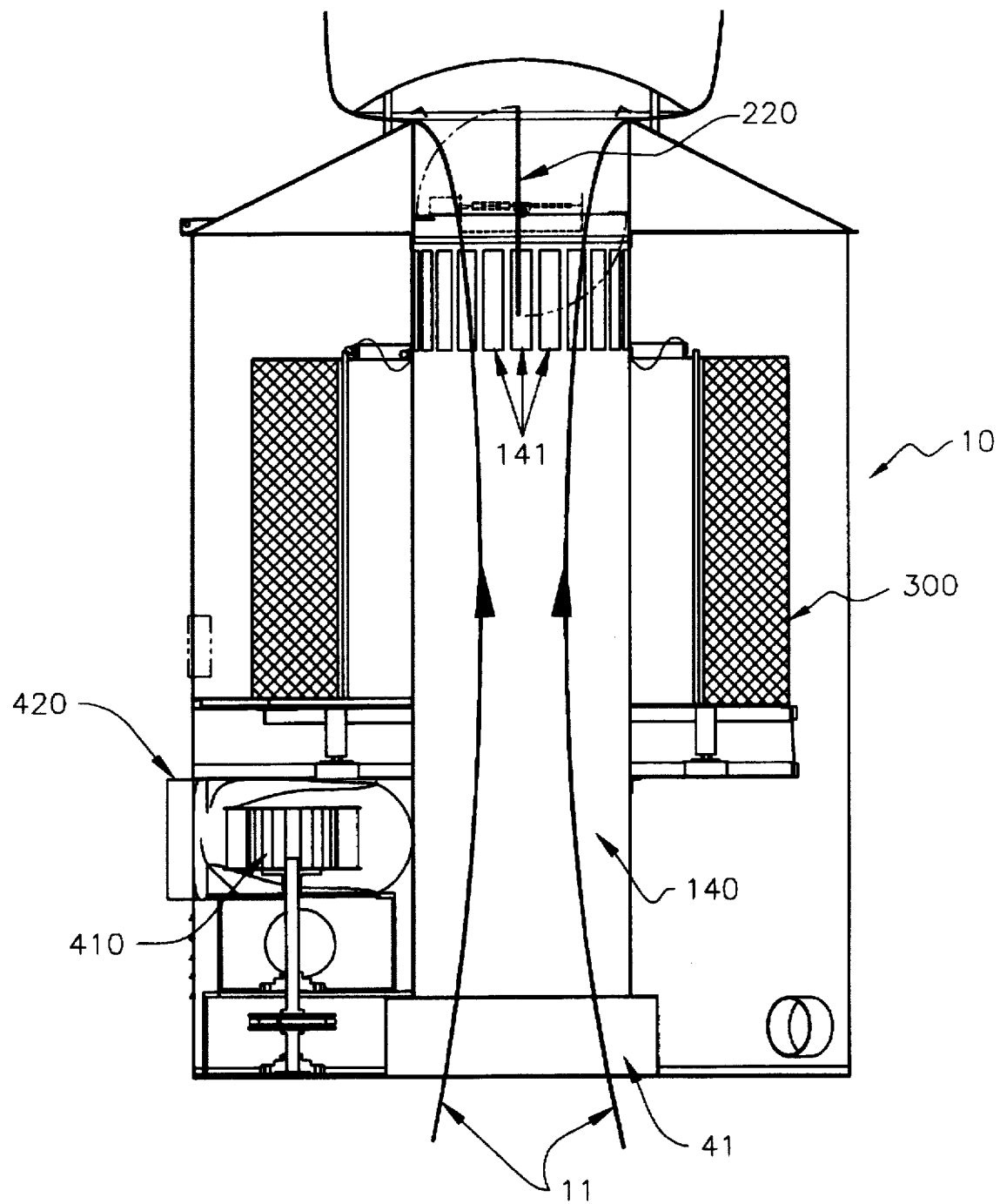
Figure 3C:
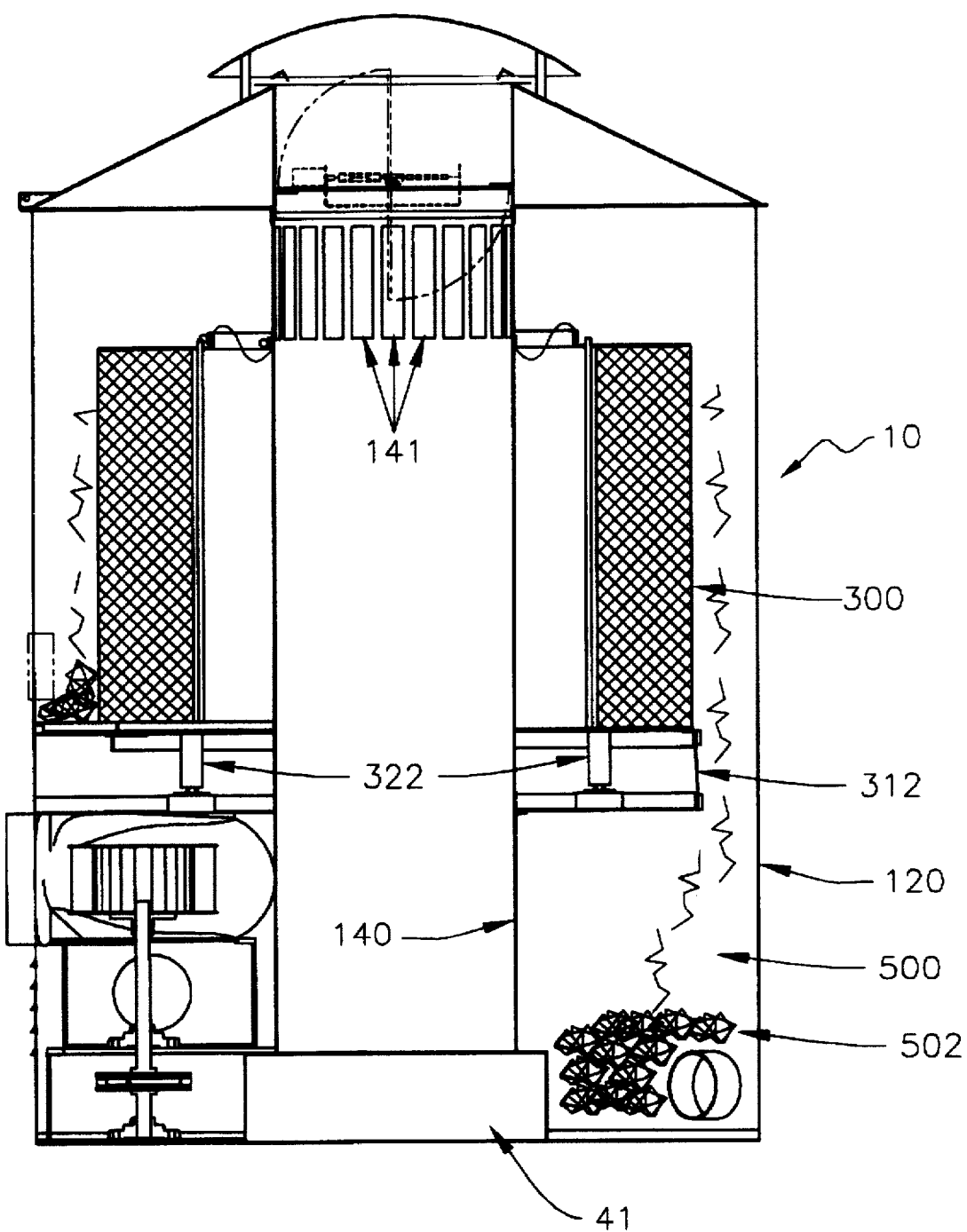

FIGS. 3A-C depict three operating modes of smoke filtration unit 10, i.e., the filtering mode, venting mode, and cleaning mode, respectively. When in the filtering mode, shown in FIG. 3A, shutter 220 is moved to a closed position in a manner detailed below so that exhaust smoke from, e.g., a chimney flue 41 is ducted directly to filter assembly 300. The flow of the exhaust gas through unit 10 is depicted by arrowed lines 11. Shutter 220 is preferably circular in shape, and is pivotally mounted to rotate within internal duct 140 defined within unit 10 between a closed position and an open position, as shown in FIG. 3B. Openings 141, machined in the sides of internal duct 140, permit exhaust smoke to pass through the sides of the internal duct 140 and into the filter assembly 300 when the shutter is in the closed position. Filter assembly 300 removes particulates from the smoke. The residual gas is then drawn by the fan 410 from the filter assembly 300 and is exhausted to the atmosphere through exhaust vent 420.

In the venting mode depicted in FIG. 3B, the shutter 220 rotates to its nominal or open position. In this position the shutter allows exhaust gas to pass directly to the atmosphere. The venting mode is activated when unsafe operating conditions are detected within unit 10, for instance when the filter becomes clogged with particulate matter, or when a fire is detected. During such conditions, the exhaust smoke will be vented directly to the atmosphere without filtering.

Figure 4:
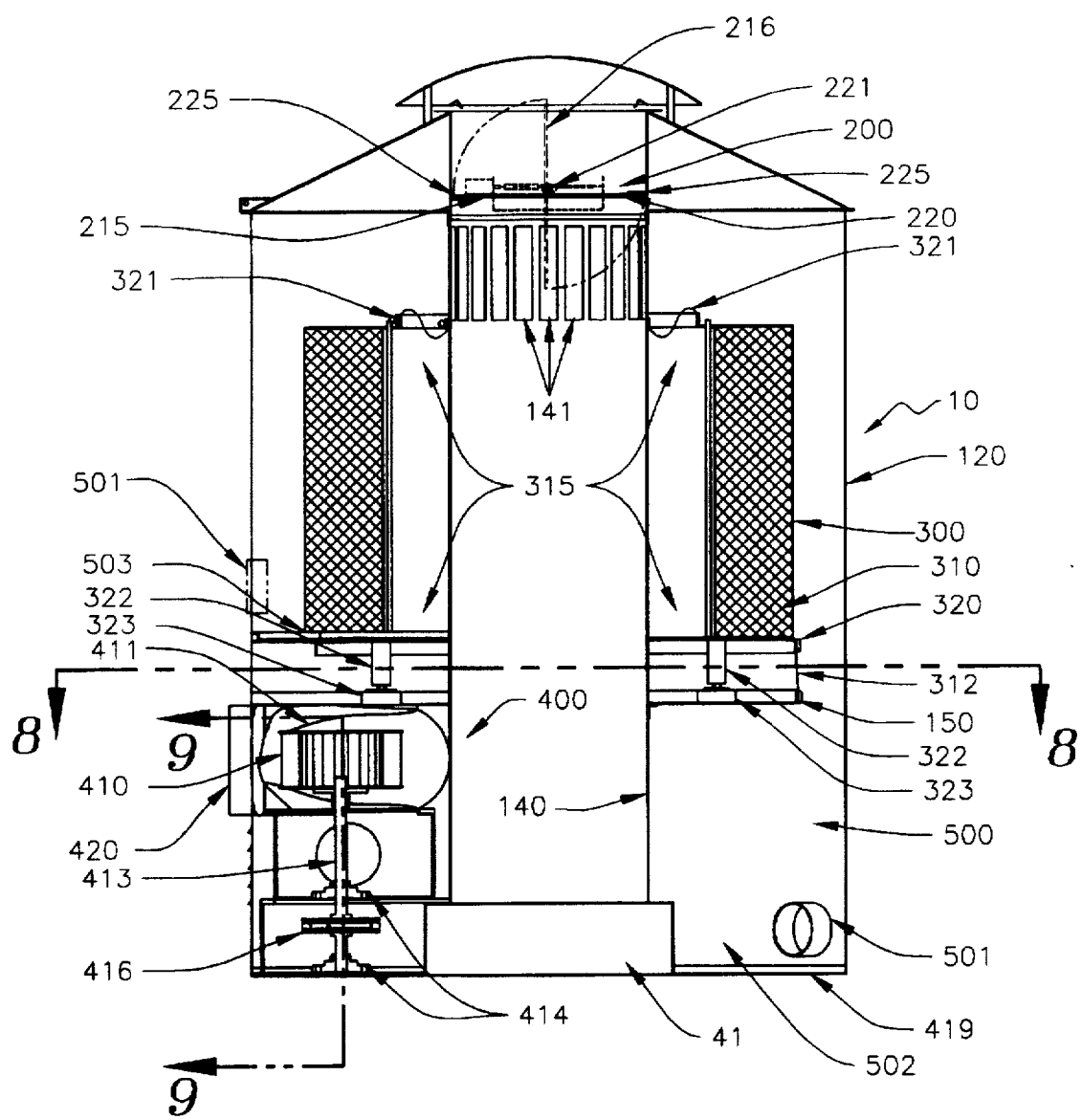
FIG. 4 is a cross-sectional view taken along line 3A, 3B, 3C, 4-3A, 3B, 3C, 4 of FIG. 2 showing a smoke filtration unit made in accordance with the invention.
Figure 5A:
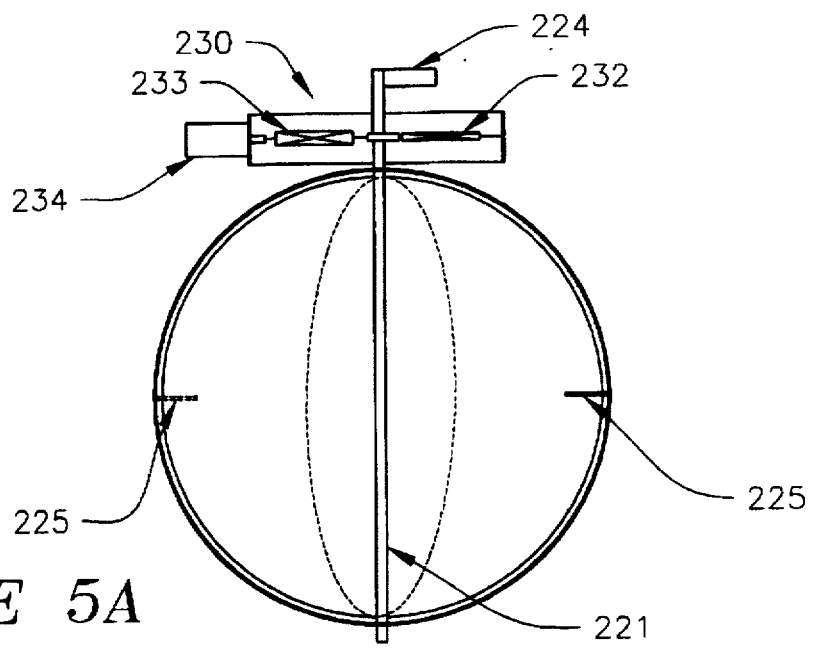
FIGS. 5A-C are plan views depicting the details of the shutter drive assembly used in the smoke filtration unit illustrated in FIG. 4.
Figure 5B:
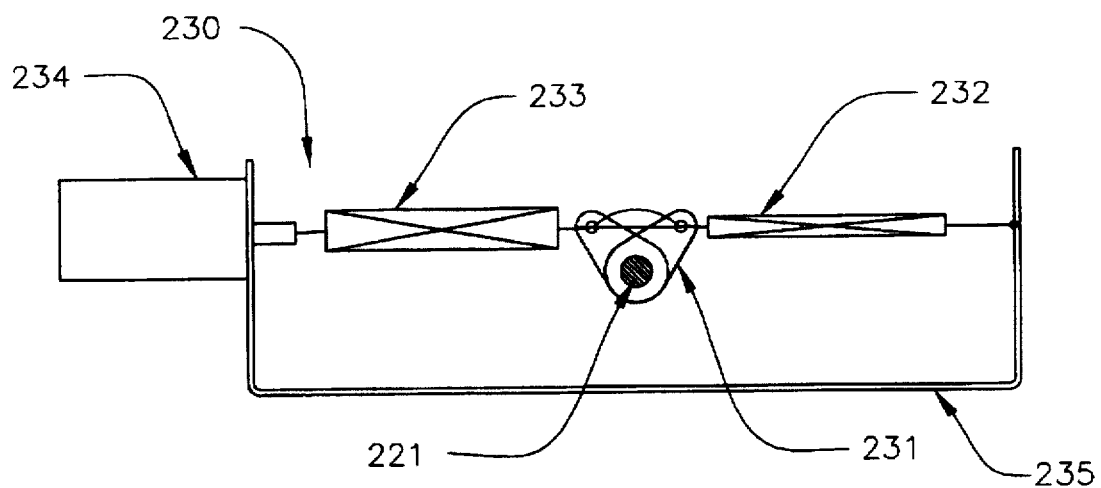
Figure 5C:
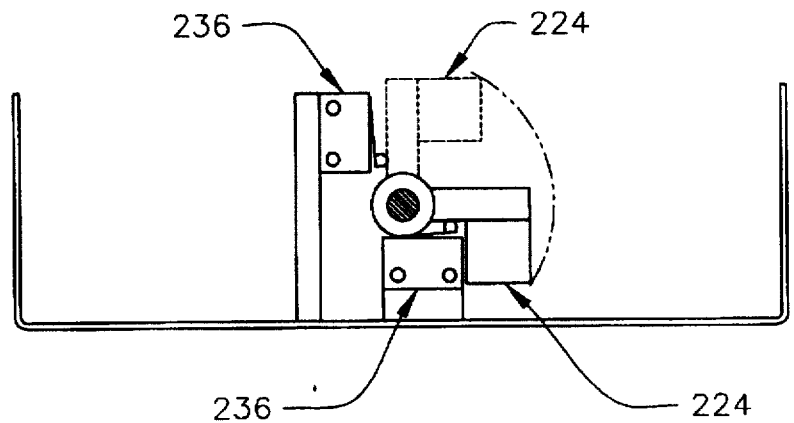
Figure 8:
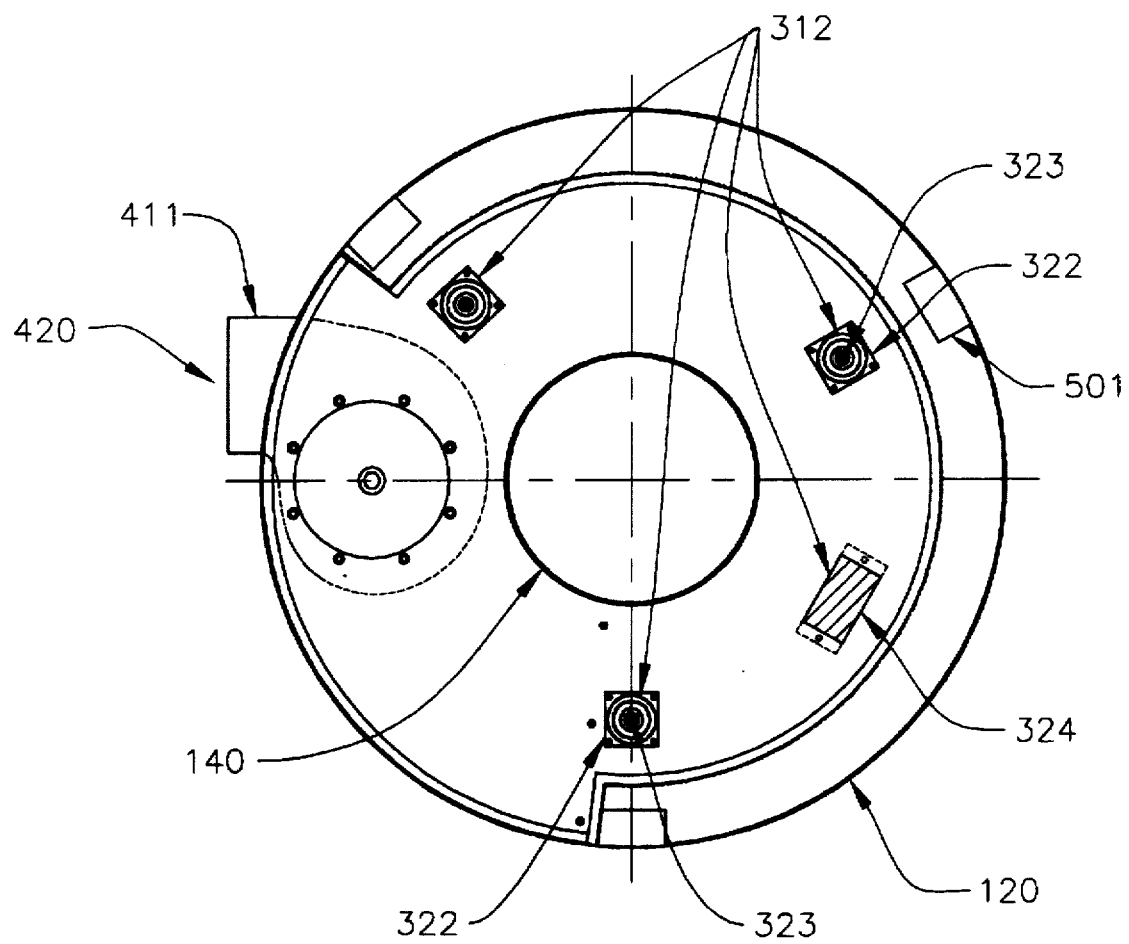
FIG. 8 is a cross-sectional view taken along line 8—8 of FIG. 4 showing the vibrator and filter mount assembly of the smoke filtration unit of the invention.

When it is desired to clean the unit, or when a clogged filter is detected, unit 10 may be switched or may be set to switch automatically into its cleaning mode as depicted in FIG. 3C. When in the cleaning mode, vibration means 312 are energized, thereby vibrating the filter and dislodging particulate matter that has collected on the surface of the filter. The vibration means 312, shown in greater detail in FIGS. 4 and 8, may comprise, in a preferred embodiment, an electromagnetic vibrator unit 324 (see FIG. 8) that causes vibrations which are transmitted to the filter assembly 300 through vibration mount standoffs 322 (FIGS. 4 and 8). If desired, however, this operation can be carried out by the use of a variety of alternate mechanisms and devices well known in the art. The dislodged particulate material falls into ash collection means 500. Ash collection means 500 comprises an area 502 near the bottom of unit 10 defined in part by internal duct 140 and outer housing 120.

Smoke filtration unit 10 is depicted generally in cross-sectional views at FIGS. 3–9. The unit generally comprises two coaxial cylindrical sections, the first forming the outer housing 120 and the second forming internal duct 140. Internal duct 140 aligns with and forms an extension of the chimney flue 41. Exhaust smoke that is generated by, e.g., a fireplace, passes up the flue 41 and into internal duct 140, toward the shutter assembly 200 as depicted in FIGS. 3A–B. When it is desired to filter the exhaust smoke, the shutter 220 rotates to a closed position. The exhaust smoke is thus blocked from exiting the top of unit 10 and is instead directed to and through the filter assembly 300. The exhaust fan 410, located downstream from filter 320, draws exhaust smoke through openings 141 in the internal duct 140 and through the filter 310. Residual exhaust gas exits the filter and is vented out to the atmosphere through the exhaust vent 420 by the exhaust fan 410. Thus the smoke filtration unit of the invention comprises four major assemblies, the shutter assembly 200, the filter/vibrator assembly 300, the fan drive and fan motor assembly 400 and the electronic controller, which are further described below.

1. Shutter Assembly

A. Preferred Embodiment

A preferred embodiment of the shutter assembly is depicted in FIGS. 4 and 5A–C. The shutter concept is based on a conventional flue damper, with a circular flat plate 220 welded to a pivot 221, serving as the moving device that is rotated up to 90 degrees to block the flue passage. The concept is fail-safe, with a shutter drive 230 and safety counterweight 224 mounted on the pivot shaft 221. In the closed position, the shutter 220 rests on a pair of pins 225 that are fixed in the walls of the internal duct 140, thereby providing a positive stop position for the shutter. A small amount of clearance is to be maintained with the internal duct 140, to permit a minor accumulation of creosote and soot, without hindering the operation of the shutter 220. The shutter drive 230 is comprised of a bell crank 231 mounted to the shaft 221, and connected to a frame 235 with a soft extension spring 232, and connected on the other side to a stiff extension spring 233 and then to a heavy duty, electric solenoid 234. The shaft extension provides a mounting location for an over-center counterweight 224 for added safety. Should one or both of the springs break, the counterweight will serve to keep the shutter open.

In operation, the starting of the fan motor (see FIG. 9 and accompanying description) will cause the solenoid 234 to engage and thus retract, pulling the stiff extension spring 233. This will overcome the other spring 232 and the force of the counterweight 224, and cause the shaft 221 to rotate to the stop pin 225 location. Two microswitches 236 operate as limit switches to detect when the shutter is at closed position 215 and open position 216.

B. Alternate Embodiment

Figure 6A:
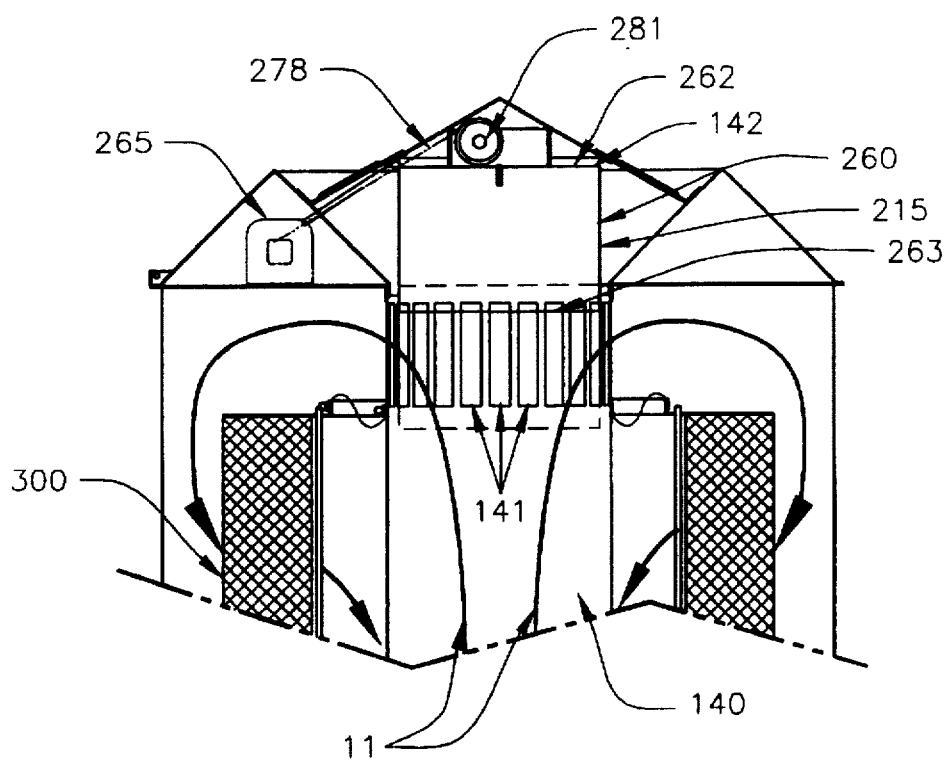
FIGS. 6A-B depict an alternate embodiment of a shutter drive for use in the smoke filtration unit of FIG. 4.

An alternate shutter embodiment is depicted in FIGS. 6A–B and 7A–C. In this embodiment shutter 260 is cylindrical, in shape and hollow, with end 262 closest to the atmosphere and end 263 closest to the chimney flue 41 open. Openings 141, machined in the sides of the internal duct 140, permit exhaust smoke, shown as lines 11, to pass through the sides of the internal duct 140 and into the filter assembly 300 when the shutter 260 is in the closed position, as depicted in FIG. 6A. A shutter cap 142 at the top of internal duct 140 ensures that exhaust smoke passes into the filter assembly by capping the shutter end 262 closest to the atmosphere as depicted in FIG. 6A.

Figure 6B:
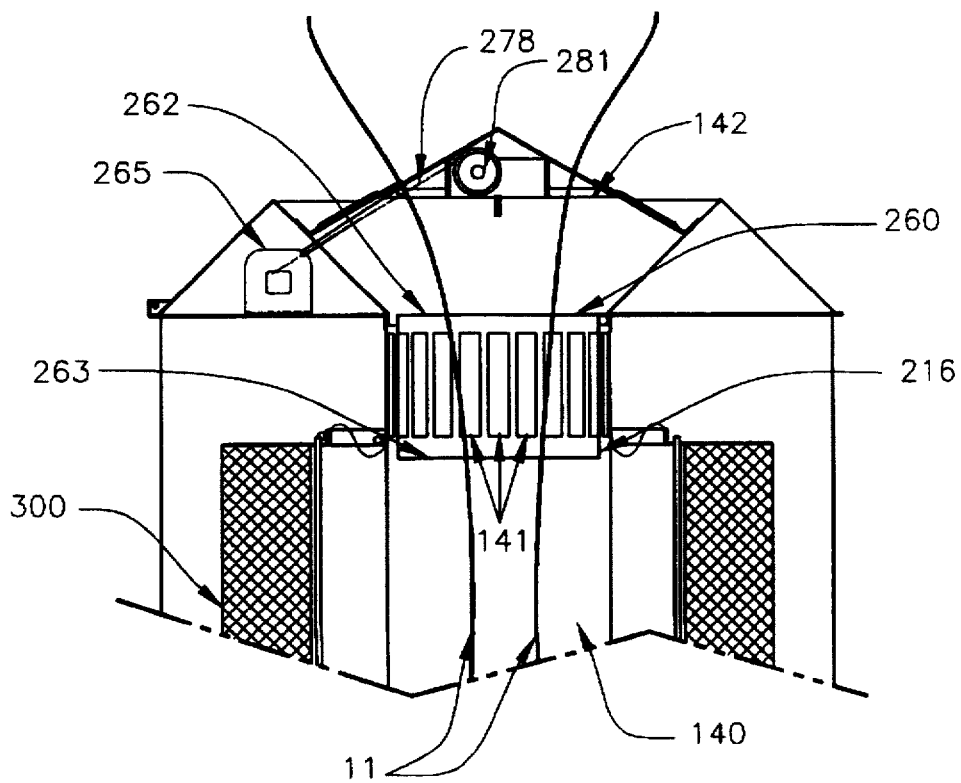

In the venting mode depicted in FIG. 6B, the shutter 260 moves to its nominal or open position 216. In this position the shutter sides occlude the openings 141 in the internal duct 140, thereby preventing exhaust smoke from passing into the filter assembly 300. Since neither end of the shutter 260 is closed, and since the shutter 260 is no longer in contact with the shutter cap 142, the exhaust smoke passes straight up the internal duct 140 and is vented directly to the atmosphere.

Figure 7A:
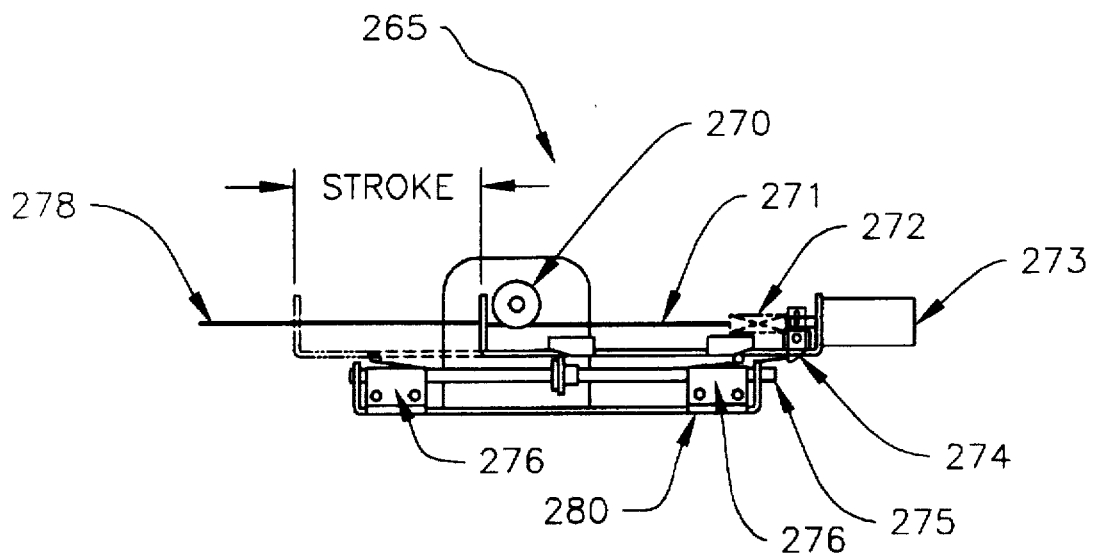
FIGS. 7A-C are plan views depicting the details of operation of the alternate shutter concept shown in FIGS. 6A-B.
Figure 7B:
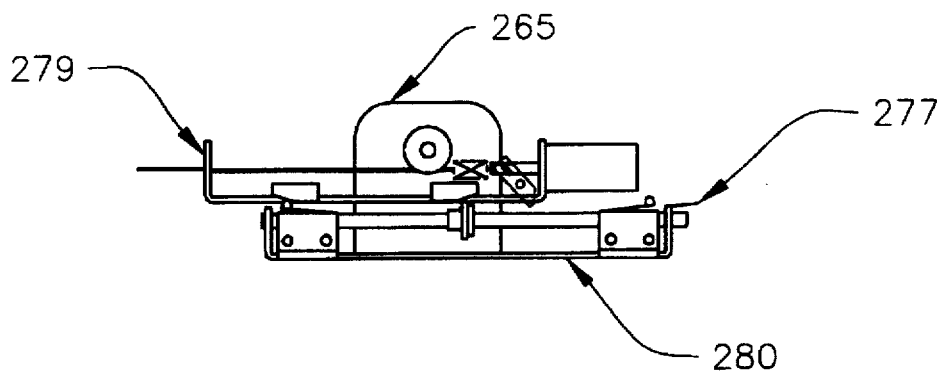
Figure 7C:
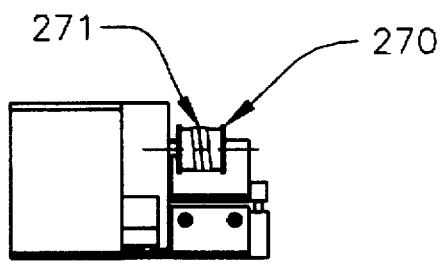

FIGS. 7A–C depicts the shutter drive assembly 265 concept for the alternate embodiment which raises and lowers the shutter using a steel cable 278. A key aspect of this design is the use of a multiple wrap band on a smooth drum, that is tensioned using an electro-mechanical solenoid. Just as a string loosely wrapped around a dowel will slip under tension, the action of a applying tension on both sides of the dowel will cause a considerable amount of torque to be reacted by the dowel. This concept is applied herein by mounting a thin belt 271 within a sliding frame 279, with one end fixed—the strap wrapped around a drum 270 on the motor shaft and the other attached to the solenoid 273. An extension spring 272 is located between the belt 271 and solenoid 273, providing compliance for the solenoid when actuated. The cable is attached to the end of this frame, and then around a pulley 281 shown in FIGS. 6A–B. Referring again to FIGS. 7A–C, a base support rail 280 with guide 275 will support the frame 279, and provide end stops. A pair of microswitches 276 are mounted to this frame, to allow detection of the shutter position as being either up or down. The concept also employs a power-on latch 274, so that when the shutter reaches the up (closed) position, the latch will engage a catch 277 and hold the sliding frame assembly 279 in position, and the motor may turn off, leaving the electric solenoid 273 engaged.

The power-off condition will cause the belt 271 to be loose, thus no torque will be transmitted to the motor shaft, and the frame will be free to slide under the weight of the shutter. Normal operation of this device begins with the engagement of the solenoid 273 and the motor simultaneously. The pulling motion of the solenoid causes the spring to extend, and tighten the strap on the motor drum. As the belt 271 tightens, the rotation of the drum 270 will cause the belt 271 to be pulled in, thus sliding the frame 279 and attached cable toward the motor. When the frame reaches the up limit switch, the latch 274 will engage a mating leaf spring catch 277, and the motor is simultaneously turned off. The solenoid remains powered, to keep tension on the belt 271, thus assisting in holding the sliding frame 279 in position.

The latch 274 is a small plate linkage connected to the solenoid push rod, with a separate pivot point, and a sharp end used to engage the leaf spring. When the solenoid is turned off, the latch is free to rotate, thus the weight of the shutter (cable tension) will release the latch and allow the frame to freely slide.

2. Filter/Vibrator Assembly

A preferred embodiment of the filter/vibrator assembly 300 is depicted in FIGS. 4 and 8 and comprises several elements, including the filter 310. The filter 310 is preferably (but not necessarily) cylindrical in shape and comprises, in a preferred embodiment, a supporting matrix, e.g., of wire or wire mesh, which holds the filtering material in place. The filtering material can be polyester, TEFLON, fiberglass, an aramid fiber such as NOMEX®, or any other material known to one of ordinary skill in the art which is capable of filtering particulate matter from hot exhaust gas. As shown in FIG. 4, the filter 310 is mounted on vibration means 312, preferably comprising a vibration mount 315 so that the filter can be vibrated to dislodge particulate matter therefrom when it becomes clogged. The vibration mount 315 comprises a lower vibration plate 320 and an upper vibration plate 321. The lower vibration plate 320 is mounted on vibration mount-standoffs 322, which are in turn set on vibration mounts 323. The vibration mounts 323 are set within lower vibration plate 150.

Also set within lower vibration plate 150 is electromagnetic vibrator unit 324 (FIG. 8), which is well known in the art. The conventional electromagnetic vibrator unit 324 provides the vibrations which are transmitted to the filter 310 so that particulate matter on the surface of the filter can be dislodged during cleaning cycles or during operation of the unit when an overpressure situation is detected. The dislodged particulate matter falls into ash collection area 502, described below.

3. Fan Assembly

Figure 9:
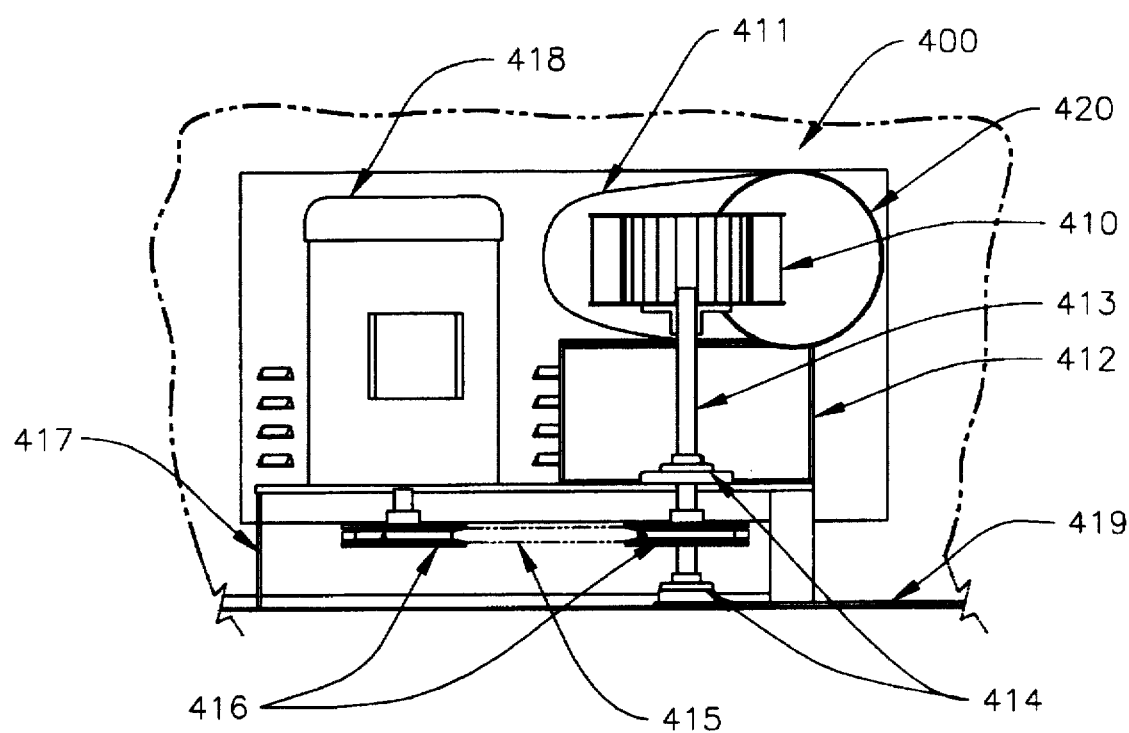
FIG. 9 is a cross-sectional view taken along line 9—9 of FIG. 4 showing the fan drive and fan motor assembly of the smoke filtration unit of the invention.

A preferred embodiment of the fan drive assembly 400 is depicted in FIGS. 4 and 9 and comprises a fan 410 and fan motor 418. Fan 410 is mounted within blower housing 411. Fan motor 418 is preferably but not necessarily a ¾ horsepower motor and drives fan 410 through a pulley system comprising pulleys 416 connected by belt 415. Pulleys 416 and belt 415 drive the fan shaft 413, which in turn rotates the fan 410. Fan shaft 413 is mounted within pillow blocks 414. The lower pillow block 414 is mounted atop base plate 419. The motor 418 is held in place in part by motor mount plate 417. The blower housing 411 is held in place by blower mount 412.

As shown in FIGS. 3C and 4, located immediately below the filter assembly 300 is ash collection area 502. The ash collection area is defined in part by outer housing 120 and internal duct 140. The baseplate 419 forms the third surface of the collection area 502. Ash cleanout ports 501 are provided so that a technician can gain access to the ash collection area to clean out accumulated ash. On the side of fan drive assembly 400 an ash cleanout port 501 is provided above the assembly 400 because, as is apparent in FIGS. 3C and 4, particulate matter dislodged from the filter 310 immediately above the fan drive assembly 400 will accumulate on shelf 503 formed by a portion of the vibration mount 320.

4. Electronic Controller

Figure 10:
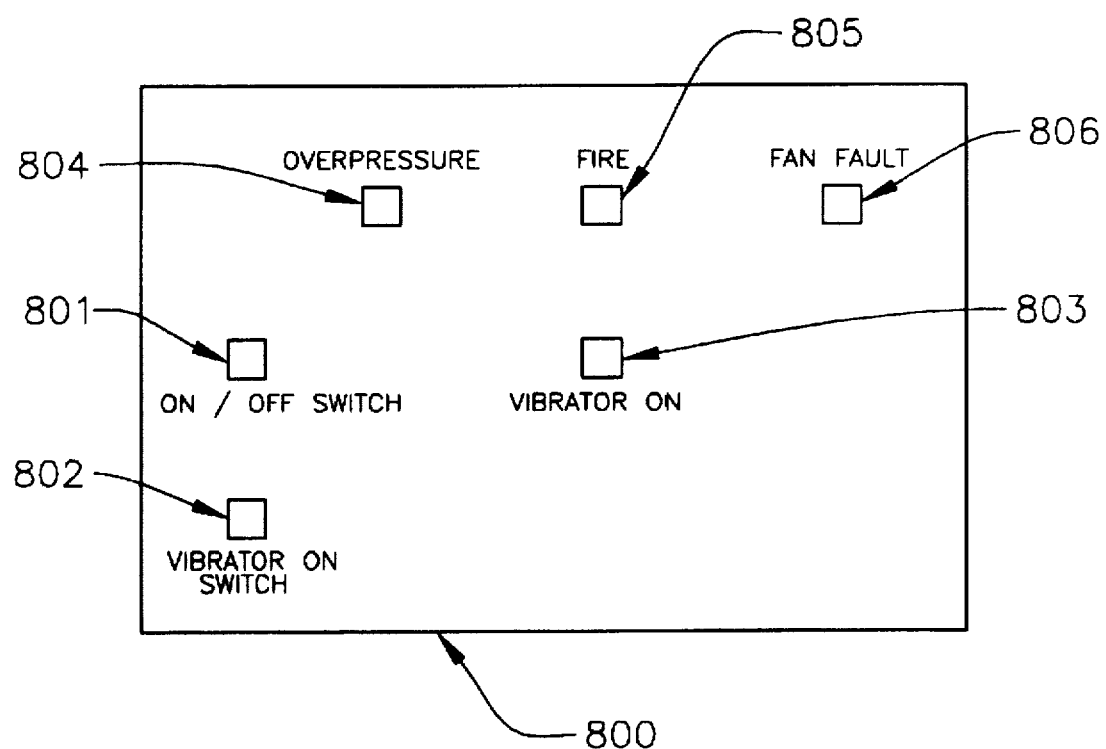
FIG. 10 depicts an electronic controller panel used for controlling the smoke filtration unit of the invention.

The operation of the smoke filtration unit 10 is controlled electronically from a user panel 800, one possible version of which is depicted in FIG. 10. The user panel 800 forms part of an electronic controller system that also includes a microcontroller that monitors the operation of unit 10 and displays current operating conditions.

Figure 11:
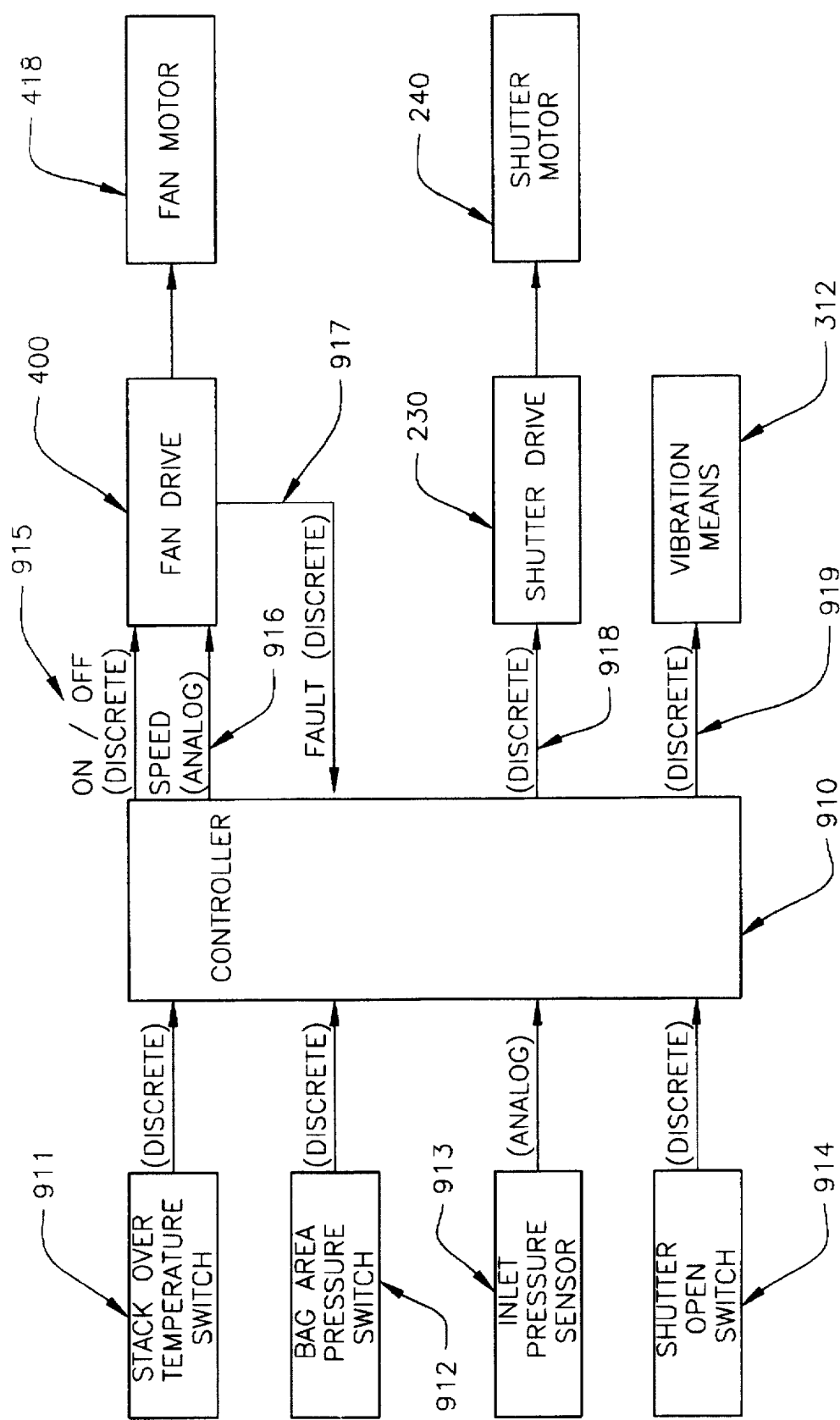
FIG. 11 is a flowchart depicting the operation of the electronic control system for the smoke filtration unit of the invention.

The elements that comprise the controller system are depicted in the schematic provided in FIG. 11. The controller 910 is a standard microcontroller, well known in the art. The controller 910 monitors, in the preferred embodiment, one sensor and four switches during operation, namely a temperature switch 911, filter pressure switch 912, inlet pressure sensor 913, shutter control switch 914, and fan drive fault switch 917.

The temperature switch 911 preferably comprises a thermocouple that is set for a predetermined temperature. This switch will normally have a closed electrical contact which will open when it senses a temperature above a preset level, indicating that the exhaust gas is too hot and the system should shut down. This switch is preferably located within the internal duct 140.

Filter area pressure switch 912 may, in one embodiment, be a diaphragm device, with an internal diaphragm and contact switches. The filter area pressure switch 912 will have a normally closed electrical contact which will open when the pressure in the filter gets above a predetermined level, indicating that the filter is clogged with particulate matter.

Inlet duct pressure sensor 913 measures the pressure in the internal duct 140 and provides an analog 4–20 milliamp signal that is proportional to pressure.

Shutter control switch 914 is preferably a reed-type, magnetic switch that will have a normally open electrical contact that will close when the shutter is fully open.

Accordingly there are six inputs to the controller, namely, on/off switch 801, vibrator on switch 802, stack temperature switch 911, inlet duct pressure sensor 913, shutter control switch 914, and fan drive fault 917. The microcontroller monitors these inputs during operation and a program in memory generates control signals in dependence on these inputs. The controller 910 controls operation of the fan drive 400 through a discrete on/off signal 915 and an analog speed signal 916. The controller controls operation of the shutter drive 230 by issuing a discrete control signal 918. The controller controls operation of the vibration means 312 by issuing a discrete signal 919. Of course, as one of ordinary skill would recognize, the invention is not limited to the use of the specific embodiments described above of the respective switches, sensors and controllers and alternate embodiments serving the same functions as described herein are also acceptable for use in unit 10.

There are three modes of operation for unit 10, namely the startup mode, normal running mode, and alarm mode. In the startup mode the system receives an "on" signal entered by on/off switch 801 from the control panel 800. In response, the controller generates a signal 919 energizing the filter vibrating means 312 for a predetermined period of time to dislodge any residual particulates remaining in the filter 310 from the last period of operation. The user can manually operate the vibration means through switch 802. The operation of the vibrator means is signalled by a light 803 on control panel 800. After a settling delay, the program proceeds to the normal running mode.

In the normal running mode, the control 910 energizes the fan motor 418 and causes it to run at a predetermined speed by issuing signals 915 and 916. The controller monitors the signal from the inlet duct pressure sensor 913 and uses this signal as the input to a proportional-integral-derivative control loop having atmospheric pressure as its set point to control fan speed. The program adjusts the fan speed to keep the inlet pressure at the set point by issuing an analog signal 916.

In the alarm mode, if the system detects an overpressure situation due, for example, to a clogged filter, or a fire in the chimney as indicated by an excessive inlet temperature, or a fan fault due to faulty operation of the fan, the control returns the shutter to its open position and shuts the unit off, while indicating the cause of the problem on control panel 800 through overpressure light 804, fire light 805, or fan fault 806.

II. Second Preferred Embodiment

Figure 12:
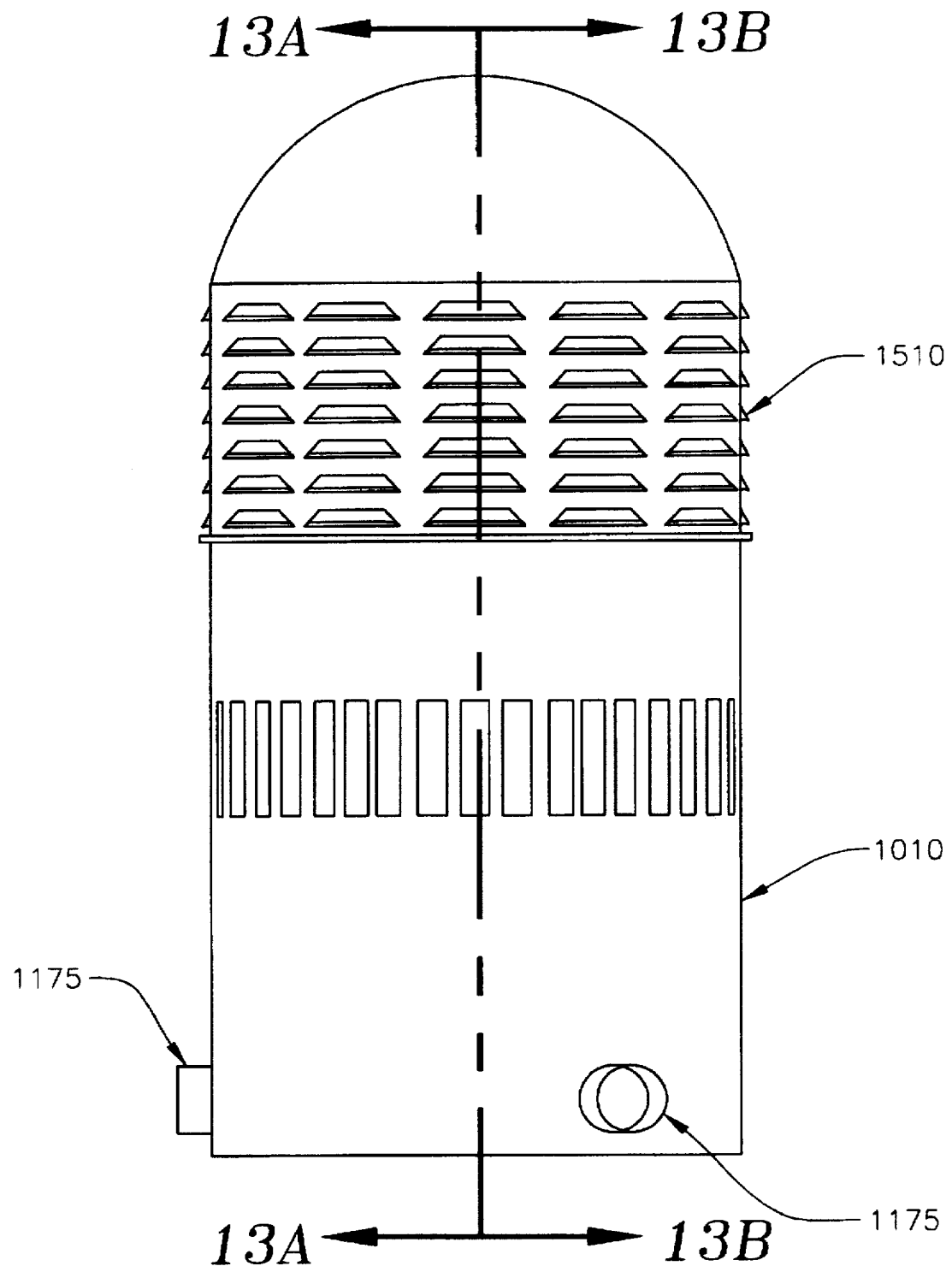
FIG. 12 is a perspective view of an alternate embodiment of the smoke filtration unit of the smoke filtration unit of the invention.

A second preferred embodiment of the smoke filtration unit made in accordance with the invention is generally depicted at FIGS. 12–13.

A. General Description

In FIGS. 13A-B the smoke filtration unit 1010 of the present invention is depicted in vertical cross-sectional views taken along lines 13A—13A and 13B—13B of FIG. 12. As shown, the smoke filtration unit 1010 comprises two main portions, the lower housing 1100 and the upper housing 1500.

The lower housing 1100 of the smoke filtration unit 1010 is mounted on the flat upper surface 42 of a chimney 40. The lower housing 1100 has a mounting flange 1110 that wraps around the chimney 40. A portion of the chimney flue 41 extends upward into the lower housing 1100. This forms a tight enclosure thereby ensuring that smoke will not escape from between the smoke filtration unit 1010 and the chimney 40. The lower portion 1101 of the lower housing 1100 is cylindrical in shape.

1. Shutter Assembly

Contained within the lower portion 1101 of the lower housing 1100 is a shutter assembly 1200. The shutter assembly 1200 comprises a shutter 1220, a shutter drive 1240 and shutter drive motor 1260.

The shutter 1220 is cylindrical in cross section and is mounted coaxially with the vertical axis 1091 of the smoke filtration unit 1010. In the subject embodiment, shutter 1220 has ends 1221 and 1222 that are open. The shutter drive 1240 and shutter drive motor 1260 drive the shutter 1220 between two positions 1224 and 1225. In the lower position 1224 shown in phantom in FIG. 13A, the exhaust smoke will be passed unfiltered to the atmosphere through unfiltered exhaust vents 1130. In the upper position 1225 the solid sides 1223 of the shutter 1220 occlude unfiltered exhaust vents 1130 and direct exhaust smoke to the filter bag assembly (described below) for filtering.

The shutter drive 1240 comprises a capstan 1241, a wire 1242 and a pulley 1243 as shown in FIG. 13B. The drive motor 1260 drives shutter drive 1240 and the shutter 1220 between lower 1224 and upper 1225 positions. When the shutter assembly 1200 is energized, the shutter 1220 covers unfiltered exhaust vents 1130. Thus smoke is directed up to the fan assembly 1300. During power failures or alarm conditions associated with bag overfilling or fires, the shutter assembly 1200 is deenergized and shutter 1220 drops to the low point in its travel 1224, exposing unfiltered exhaust vents 1130 and discharging smoke without filtration.

At the top of the lower housing are the fan and bag assemblies 1300, 1400.

2. Fan Assembly

Fan assembly 1300 comprises a semi-conical duct 1301 which defines a gas path that leads directly to the fan 1302. The duct 1301 is arranged so that when the shutter mechanism is energized the duct 1301 aligns with the shutter 1220. This forms a tight seal which prevents exhaust smoke from escaping through unfiltered exhaust vents 1130 during filtering operations. At the top of duct 1301 is the fan 1302 and immediately above the fan 1302 is the fan motor 1303.

3. Bag Assembly

During operation, smoke is drawn up through semi-conical duct 1301 and through fan 1302 into the bag assembly 1400. The smoke passes into individual bags where particulate matter is filtered and collected, and the residual gas vented through the sides of the bags.

Although only two filter bags 1410 are visible in FIG. 13A, filter bag assembly 1400 preferably comprises five bags although the specific number of bags is not critical. Bags 1410 are mounted in cages 1411 in order to retain the bags in position since during operation the bags 1410 will be subject to a positive pressure. The bags preferably can be made from polyester, fiberglass, TEFLON or NOMEX®, or any other material known in the art that is capable of filtering particulate matter from exhaust smoke.

Located at the bottom of the bag assembly 1400 is the bag shaker assembly 1450. The bag shaker assembly 1450 comprises a frame 1451 in which the mouths 1412 of bags 1410 are mounted. The frame 1451 is in turn connected through an arm 1452 to a motor 1453. When it is desired to clean out the bag assembly, e.g., when it is filled, the user pushes a button on a control panel which energizes the motor 1453. The motor 1453 vibrates the frame 1451, shaking collected particulate matter from the bags 1410 and into the ash collection area 1170.

4. Upper Housing and Ash Collection Area

Mounted above the bag assembly 1400 is the upper housing 1500. Upper housing comprises a cylindrical cover ending in a dome 1501 with vents 1510 machined in its sides 1503 to align with individual bags. During operation the exhaust smoke passes through the bags, is filtered, and the residual gas passes through filtered exhaust vents 1510.

Located immediately below the filter bag assembly 1400 is the ash collection area 1170. The upper surface of cylindrical duct 1301 forms a portion of the ash collection area 1170.

An annular ring 1171 forms the bottom of the ash collection assembly 1170, while a portion of the side of lower housing 1100 forms the other side of the ash collection assembly 1170. A deflector plate 1174 completes the structural elements that form the ash collection assembly. During operation of the shaker 1450, particulate debris collected by the filter bags 1410 is knocked loose and falls onto the deflector plate 1174 or upper surface of conical duct 1301. The dislodged material then collects on top of annular ring 1171. To ease cleaning vacuum ports 1175 are provided. An attendant can use these ports to vacuum the particulate debris from the ash collection assembly 1170.

Thus it is seen that an apparatus and method for cleaning exhaust smoke of particulate matter generated by fireplaces, coal- and wood-burning stoves, and oil- and gas-fired furnaces are provided. One skilled in the art will appreciate that the present invention can be practiced by other than the described embodiments; which are presented for the purposes of illustration and not of limitation; and the present invention is therefore limited only by the claims that follow.

We claim:

1. A smoke filtration unit for removing particulate matter from exhaust smoke, comprising:

an outer housing;

ducting means located in said outer housing for directing exhaust smoke produced by a fireplace, stove or furnace from an exhaust flue into filtration means, said exhaust smoke containing a quantity of particulates;

filtration means located in said outer housing for removing said particulates from said exhaust smoke;

fan means located in said outer housing and adapted for providing suction to draw said exhaust smoke into said filtration means and to exhaust from said unit residual gas produced upon removal of said particulates from said exhaust smoke;

filtered exhaust vent means for venting said residual gas to the atmosphere;

unfiltered exhaust vent means for ducting unfiltered exhaust smoke directly to the atmosphere; and shutter means between said ducting means and said filtration means for directing, under predetermined conditions of temperature and pressure, said exhaust smoke either to said filtration means for filtering or to said unfiltered exhaust vent means for venting said exhaust smoke directly to the atmosphere.

2. The smoke filtration unit of claim 1 further comprising:
computerized controller means for detecting excessive heat conditions and fire in said smoke filtration unit and for moving said shutter means when said excessive heat or fire is detected to a position where said exhaust smoke is vented directly to the atmosphere without filtration.

3. The smoke filtration unit of claim 1 further comprising:
computerized controller means for detecting a predetermined pressure differential between said filtration means and said filtered exhaust vent means and for energizing a cleaning means in response to said differential for removing particulates from the filtration means when said predetermined pressure differential is detected.

4. The smoke filtration unit of claim 1 further comprising:
computerized controller means for detecting a predetermined pressure differential between said filtration means and said filtered exhaust vent means, and for moving said shutter means in response to said differential to a position where said exhaust smoke is vented directly to the atmosphere without filtration.

5. The smoke filtration unit of claim 1 wherein said filtration means comprises a cylindrical filter comprising a supporting matrix configured and adapted to contain a filtering material.

6. This smoke filtration unit of claim 5 wherein said supporting matrix is formed of wire mesh.

7. The smoke filtration unit of claim 5 wherein said filtering material is a material selected from the group consisting of polyester, polytetrafluorethylene, fiberglass and aramid fibers.

8. The smoke filtration unit of claim 1 where said filtration means comprises a cylindrical filter comprising a supporting matrix configured and adapted to contain a filtering material and wherein said unit further comprises vibrator means located adjacent to said cylindrical filter, said vibrator means adapted for vibrating said filter when the pressure within said unit reaches a predetermined level indicating said cylindrical filter has become clogged with said particulate matter, to dislodge at least a portion of said particulate from said filter.

9. The smoke filtration unit of claim 1 where said filtration means comprises at least one filter bag, said at least one filter bag constructed of a filtering material adapted for preventing passage of said particulate matter within said exhaust smoke while allowing said residual gas to pass therethrough through an opening therein.

10. The smoke filtration unit of claim 9 where said filtering material is a material selected from the group consisting of polyester, polytetrafluorethylene, fiberglass and aramid fibers.

11. The smoke filtration unit of claim 1 where said filtration means comprises at least one filter bag, wherein said at least one filter bag has an opening for receiving said exhaust smoke and is constructed of a filtering material adapted for preventing passage of said particulate matter from said exhaust smoke while allowing said residual gas to pass therethrough, and further wherein said unit additionally comprises vibrator means located adjacent to said at least one filter bag, said vibrator means adapted for vibrating said filter when the pressure within said unit reaches a predetermined level indicating said at least one filter bag has become clogged with said particulate matter, to dislodge at least a portion of said particulate matter from said at least one filter bag.

12. A smoke filtration unit for removing particulate matter from exhaust smoke, said unit comprising:

an internal cylindrical duct having a first end and a second end, said first end connected with and forming an extension of an exhaust flue configured and adapted to duct exhaust smoke produced by a fireplace, stove or furnace to said unit, said exhaust smoke containing a quantity of particulates, said internal cylindrical duct having at least one opening machined in the surface of said internal cylindrical duct;

a cylindrical shutter mounted coaxially in said cylindrical duct at said second end thereof, said cylindrical shutter movable between at least two positions, wherein in a first one of said positions said shutter directs exhaust smoke to a first internal volume within said smoke filtration unit, and in a second one of said positions said shutter aligns with and covers said at least one opening in said internal cylindrical duct thereby directing unfiltered exhaust smoke to the atmosphere, said cylindrical shutter having an open top, and a bottom open to said cylindrical duct;

a filter assembly comprising a cylindrical filter mounted coaxially between said outer housing of said smoke filtration unit and said internal duct, said exhaust smoke directed through said at least one opening in said internal cylindrical duct into said first internal volume of said residential smoke filtration unit formed by said outer housing and said filter and then through said filter into a second internal volume between said filter and said internal duct;

exhaust ducting for ducting said residual gas in second internal volume between said filter and said internal duct to the atmosphere;

fan means adapted for providing suction to draw exhaust smoke into said first internal volume in said smoke filtration unit, through said cylindrical filter and from said second internal volume between said filter and said internal duct and to exhaust residual gas to the atmosphere;

vibration means adjacent to said filter and in contact therewith, said vibration means adapted to vibrate said filter to dislodge particulate matter therefrom; and an ash collection area comprising a third internal volume located below said first internal volume and said filter to collect ash dislodged from said filter.

13. The smoke filtration unit of claim 12 further comprising:

electronic controller means for operating said residential smoke filtration unit, wherein said controller means comprises;

a control panel comprising button means for receiving commands from a user; signal lights for indicating operating conditions; and input/output circuitry for transmitting and receiving electronic control signals to and from a microcomputer;

sensor means for sensing operating conditions in said smoke filtration unit and for producing electronic signals indicative of said operating conditions;

a microcomputer for receiving inputs comprising said electronic signals from said control panel and said sensor means, said microcomputer having an internal program for controlling said smoke filtration unit by monitoring said electronic signals and creating command signals for controlling said shutter and said fan, and for providing signals to said control panel indicative of operating conditions within said smoke filtration unit.

14. The smoke filtration unit of claim 13 wherein said sensor means comprises:

a temperature sensor for detecting the temperature of exhaust gas entering said unit.

15. The smoke filtration unit of claim 13 wherein said sensor means comprises:

a pressure sensor for detecting pressure in said filter assembly.

16. The smoke filtration unit of claim 13 wherein said sensor means comprises:

an inlet pressure sensor for measuring pressure of exhaust gas entering said unit.

17. The smoke filtration unit of claim 13 wherein said sensor means comprises:

a fan fault sensor for indicating when said fan is not meeting predetermined operating criteria.

18. A method of filtering exhaust smoke generated by a fireplace, stove or furnace, comprising the steps of:

ducting exhaust smoke containing particulates produced by a fireplace, stove or furnace from a chimney flue to a first enclosed volume of a smoke filtration unit, said first enclosed volume separated from a second enclosed volume by filter means configured and adapted for removing said particulates, said first and second enclosed volumes and said filter means being enclosed in an outer housing of the smoke filtration unit;

drawing said exhaust smoke through said filter means comprising a filter into said second enclosed volume wherein particulates entrained in said exhaust smoke are removed by said filter means, wherein a first portion of said particulates collects on said filter and a second portion thereof falls by force of gravity into a third enclosed volume located below said first enclosed volume;

drawing residual gas contained in said second enclosed volume to the atmosphere, said residual gas produced by removing at least a portion of said particulates from said exhaust smoke;

monitoring pressure in said first enclosed volume to determine if said pressure reaches a predetermined value, said predetermined value indicating that said filter has become clogged with particulates so that exhaust smoke is collecting in said first enclosed volume;

vibrating said filter for a predetermined interval to dislodge particulates clogging said filter when the pressure reaches said predetermined value; and when said pressure in said first enclosed volume does not decrease to a value below said predetermined value after said predetermined interval, venting unfiltered exhaust smoke directly into the atmosphere.

19. The method of claim 18, comprising the further steps of:

monitoring the temperature of the exhaust smoke in said first enclosed volume to determine if said temperature exceeds a predetermined value; and venting said exhaust smoke directly to the atmosphere when said temperature exceeds said predetermined value.

* * * * *